ical agents is quite surprising. While I believe that the beneficial results of the use of these additives is associated with their surface-active properties and dispersing activity in anhydrous ε-caprolactam compositions, I do not wish to be limited in any way by the use of this concept in the practice of my invention.

3,232,892
PROCESS FOR THE PREPARATION OF FOAMED POLYCAPROLACTAM

Charles Frank Fisher, Kynlyn, Del., assignor to E. I. du Pont de Nemours and Company, Wilmington, Del., a corporation of Delaware
No Drawing. Filed Oct. 2, 1961, Ser. No. 142,030
4 Claims. (Cl. 260—2.5)

This invention relates to the manufacture of cellular poly-ε-caprolactam compositions and in particular to an improved process for such manufacture, and the products of such process.

In U.S. patent application Serial Number 135,801, filed September 5, 1961, by Melvin I Kohan is described a unique process for the preparation of cellular or foamed poly-ε-caprolactam. The process in part is characterized by a procedure in which the monomeric ε-caprolactam is polymerized and foamed essentially simultaneously at temperatures which always are below the fusion point of the polymer itself. This result is achieved by heating to a temperature less than 220° C. a substantially anhydrous anionically catalyzed ε-caprolactam composition containing also a co-catalyst or synergistically active co-catalyst mixture and optionally colorants, pigments, stabilizing resins, fillers and the like while foaming the ε-caprolactam composition by means of in inert gas, and continuing the heating until the polymerization and solidification of the foamed polymeric material are complete. This process provides a foamed or cellular 6-nylon composition in a relatively short processing time, at low cost, and in shapes which easily can be formed in atmospheric pressure molds of large cross section.

I now have found that I can greatly improve the process for manufacturing the cellular 6-nylon and the product obtained thereby by including in the foamable ε-caprolactom composition caprolactam-soluble additives which exhibit surface-active properties and increase the foam-forming tendencies of the ε-caprolactam system. Additives which I have found to be especially effective are the alkali metal salts of long-chain fatty acids which also may contain one or more carbon to carbon double bonds. Especially preferred are the alkali metal salts of the long-chain fatty acids which have the structure:

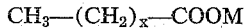

$$CH_3-(CH_2)_x-COOM$$

in which M is an alkali metal and x has a value of 8 to 25. In particular, I prefer to use the alkali metal stearates as additives in the foamable ε-caprolactam compositions.

The exclusion of water is essential for the success in the rapid co-catalyzed anionic polymerization of ε-caprolactam; thus the favorable performance in an anhydrous caprolactam system of surface-active agents is quite surprising. While I believe that the beneficial results of the use of these additives is associated with their surface-active properties and dispersing activity in anhydrous ε-caprolactam compositions, I do not wish to be limited in any way by the use of this concept in the practice of my invention.

The presence of these additives in foamable ε-caprolactam compositions results in greater efficiency of the foaming agent, more uniform distribution of the gas-filled cells throughout the polymer matrix, finer cell structure, better and more uniform distribution of pigments and fillers which may be present, a smoother surface skin on the molded cellular objects, an an enhanced ease of removal of shaped cellular objects from the molds in which they were formed.

My invention will be better understood from a consideration of the following examples.

Example 1

This example illustrates the use of a surface-active agent to improve a foam prepared by volatilizing an inert liquid.

Dried caprolactam was prepared by sparging 9072 g. of commercially pure ε-caprolactam for 30 minutes at 130° C. with dry nitrogen bubbling through the molten caprolactam at the rate of 1 liter of nitrogen/minute/pound of caprolactam.

Catalyzed caprolactam mix (2%) was prepared by cooling the above-described caprolactam (9072 g.) to 100° C., with protection from moisture and oxygen, adding 86.5 g. of sodium methylate, and sparging for 45 minutes at 100° C. using 4 l. of nitrogen/minute/pound of lactam. The mixture was degassed at 100° C. for 20 minutes by reducing the pressure from atmospheric to about 125 mm. of mercury. This reaction with the strong base produces an iminium salt of the caprolactam; the iminium anion acts as the catalyst in the subsequent polymerization.

A. Dried caprolactam (40 g.) and 2% catalyzed caprolactam mix (40 g.) were placed in a 38 mm. x 300 mm. Pyrex test tube and brought to 150° C. in an oil bath. To the molten mixture, now containing about 1% of catalyst, was added 0.7 g. of a 2-to-1 molar combination of caprolactam with methylenebis(4-phenyl isocyanate) which is a co-catalyst. The co-catalyst was thoroughly incorporated by continuing to sparge the mixture with dry nitrogen for 10 seconds. Then 2.4 g. of toluene (the blowing agent) was added and sparged in for 35 seconds, after which the sparger tube was raised above the level of the contents of the test tube reactor, the flow of nitrogen being continued for 15 minutes to exclude oxygen from above the reaction mixture. At the end of this time, the solidified and foamed polycaprolactam was cooled and removed from the test tube. The cream-colored foam had a smooth lustrous skin, and a non-uniform cell structure characterized by irregular distribution of gas-filled spaces widely varying in size and a bulk density of 47 lb./cu. ft. For comparison, unfoamed polymer in solid cast form has a density of about 71-72 lb./cu. ft.

B. The procedure described in A above was duplicated with the exception that 2.4 g. (about 3% on the weight of caprolactam) of potassium stearate was included in the molten catalyzed caprolactam mixture. The foam formed with the same amount of toluene as in A occupied a greater amount of space than the foam in A above, had a much more uniform cell structure and a bulk density of 28.5 lb./cu. ft.

C. Repetition of the procedure of B above, but reducing the amount of potassium stearate to 0.8 g. (about 1% by weight), resulted in a foamed polycaprolactam composition having a density of 33.6 lb./cu. ft. but a cell structure more like that of foam A than foam B.

D. This preparation was the same as C above except that sodium N-laurylsarcosinate was used as the surface-active agent instead of potassium stearate. This foam had a more uniform cell structure than foam C and a density of 36 lb./cu. ft.

E. The procedure was the same as in C above except that an equal weight of sodium oleylmethyltaurate replaced the potassium stearate. The foamed polymer was darker in color but was of about the same cell structure and density (34 lb./cu. ft.) as foam C.

Example 2

This example illustrates a foamable caprolactam composition containing potassium stearate as the surface-active agent and use of a different co-catalyst and another blowing agent of the volatile solvent type.

Dried caprolactam, as in Example 1 (40 g.), and 2% catalyzed caprolactam mix, as in Example 1 (80 g.), in a test tube were heated to 153° C.; and then there were added successively 3.6 g. of potassium stearate and a mixture containing 0.6 g. of 2,4,6-trihenoxytriazine (the co-catalyst) and 4.8 g. of trioxane (the blowing agent, both being mixed into the molten caprolactam. The contents of the test tube were poured into a cup-shaped aluminum mold preheated to 165° C., and mold and contents were held in a nitrogen-filled oven at 165° C. for 25 minutes. The resulting foam likewise was of a light cream color, had a fine uniform cell structure and a density of 35 lb./cu. ft.

*Example 3*

This example illustrates the use of a surface-active agent to improve a chemically blown polycaprolactam foam.

A. The mixture of dried caprolactam, 2% catalyzed caprolactam, and potassium stearate was prepared as in Example 1–B. To this melt at 150° C. was added a mixture of 0.7 g. of the caprolactam-isocyanate combination and 0.24 g. of $\alpha^1,\alpha^4$-diazidohexamethylbenzene which was mixed in by sparging the molten mass with nitrogen for 35 seconds. After 10 minutes in the oil bath, the foamed composition was removed from the test tube. The foam was characterized by a fine uniform cell structure, a light cream color, a very very smooth surface skin, and a density of 42.3 lb./cu. ft.

B. The procedure was the same as for 3–A above except that the potassium stearate was omitted. The resulting chemically blown foam had a similar density of 42.8 lb./cu. ft. but the cell structure was coarser and cell distribution was less uniform than in A above, and the skin surface was somewhat wavy in appearance and feel.

*Example 4*

In this example the surface-active agent was used in a composition which was foamed by vigorous mechanical agitation with a stream of nitrogen gas.

A. Dry caprolactam (20 g.) and 20 g. of 2% catalyzed caprolactam (as for Example 1) were combined in a test tube heated in an oil bath at 150° C. To the molten mixture were added successively and with mixing 0.4 g. (1%) of potassium stearate and 0.35 g. of the combination type co-catalyst of Example 1–A. Dry nitrogen at the rate of 785 cc./minute was passed into the molten caprolactam mixture through a 1 cm. diameter coarse porosity sintered glass ebullator until the froth reached a depth of 255 mm. in the 30 x 300 mm. test tube. Nitrogen flow was cut back to maintain the foam level until the froth began to gel. The ebullator was removed, and after 10 minutes the foamed composition was taken from the test tube which served both as reactor and mold. The foamed polycaprolactam composition was surprisingly strong and tough, was off-white in color, had cells varying from medium fine to medium coarse in size, and an apparent bulk density of 8.6 lb./cu. ft.

B. Repetition of the procedure of Example 4–A, but with omission of the potassium stearate, resulted in a very unstable liquid foam in which the bubbles collapsed and coalesced so quickly that the resulting polymerized product was non-uniform in structure, being filled with very large irregularly shaped spaces.

While I have used a single representative catalyst to illustrate this invention, other alkali and alkaline earth-based catalysts can be used, also other co-catalysts known to the art and not exemplified herein are effective, and further caprolactam-soluble surface-active agents other than those named herein likewise will be effective provided the agents are compatible with the several components of the mixture, which optionally also may include colorants, pigments, and fillers. I have observed that presence of the surface-active agents in the foamable caprolactam compositions, in addition to facilitating the formation of foamed products, also aids in dispersing finely divided pigments and fillers. As previously mentioned, the surface-active agents enhance the ease with which objects made from polycaprolactam compositions are removed from molds.

Having thus described and illustrated my invention, I intend to be limited only by the following claims.

I claim:

1. In a process for preparing foamed polycaprolactam which comprises admixing anhydrous ε-caprolactam in the presence of an anionic catalyst, an iminium anion, a foaming agent and a cocatalyst capable of promoting polymerization of ε-caprolactam at a temperature below the fusion point of polycaprolactam thereby effecting simultaneous polymerization and foaming of ε-caprolactam, the improvement which comprises conducting said simultaneous polymerization and foaming reaction in an anhydrous medium in the presence of a surface-active agent selected from the group consisting of alkali metal salts of long-chain saturated and unsaturated fatty acids containing 8 to 25 carbon atoms, alkali metal sarcosinates and alkali metal oleylmethyltaurates.

2. In a process for preparing foamed polycaprolactam which comprises admixing anhydrous ε-caprolactam in the presence of an anionic catalyst, an iminium anion formed by the reaction of a sodium base with caprolactam, a foaming agent and a cocatalyst capable of promoting polymerization of ε-caprolactam at a temperature below the fusion point of polycaprolactam thereby effecting simultaneous polymerization and foaming of ε-caprolactam, the improvement which comprises conducting said simultaneous polymerization and foaming reaction in an anhydrous medium in the presence of an alkali metal stearate.

3. The process of claim 2 wherein the alkali metal stearate is potassium stearate.

4. The process of claim 3 wherein the alkali metal stearate is present in amounts of from 1 to 5 percent.

References Cited by the Examiner

UNITED STATES PATENTS

| | | | |
|---|---|---|---|
| 2,268,160 | 12/1941 | Miles | 260—2.5 |
| 2,629,698 | 2/1953 | Sterling | 260—2.5 |
| 2,653,139 | 9/1953 | Sterling | 260—2.5 |
| 2,681,321 | 6/1954 | Stastny | 260—2.5 |
| 2,684,341 | 7/1954 | Anspon et al. | 260—2.5 |
| 2,698,845 | 1/1955 | Mastirs et al. | 260—78 |
| 2,739,134 | 3/1956 | Parry et al. | 260—2.5 |
| 2,831,820 | 4/1958 | Aase et al. | 260—2.5 |
| 2,884,414 | 4/1959 | Indest et al. | 260—239.3 |
| 3,017,391 | 1/1962 | Mottus et al. | 260—2.5 |
| 3,028,369 | 4/1962 | Butler et al. | 260—78 |
| 3,051,665 | 8/1962 | Wismer et al. | 260—2.5 |
| 3,060,135 | 10/1962 | Becke et al. | 260—2.5 |
| 3,065,189 | 11/1962 | Becke et al. | 260—2.5 |

MURRAY TILLMAN, *Primary Examiner.*

LEON J. BERCOVITZ, DONALD E. CZAJA,
*Examiners.*